US011267566B2

(12) United States Patent
Murakami (10) Patent No.: US 11,267,566 B2
(45) Date of Patent: Mar. 8, 2022

(54) FLYING OBJECT CONTROL DEVICE, FLYING OBJECT, AND PROGRAM

(71) Applicant: HONDA MOTOR CO., LTD., Tokyo (JP)

(72) Inventor: Hideo Murakami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/263,168

(22) PCT Filed: Jun. 18, 2019

(86) PCT No.: PCT/JP2019/024119
§ 371 (c)(1),
(2) Date: Jan. 26, 2021

(87) PCT Pub. No.: WO2020/031511
PCT Pub. Date: Feb. 13, 2020

(65) Prior Publication Data
US 2021/0188427 A1 Jun. 24, 2021

(30) Foreign Application Priority Data
Aug. 7, 2018 (JP) .............................. JP2018-148798

(51) Int. Cl.
*B64C 27/00* (2006.01)
*B64C 27/32* (2006.01)
*B64C 27/20* (2006.01)

(52) U.S. Cl.
CPC ............ *B64C 27/325* (2013.01); *B64C 27/20* (2013.01)

(58) Field of Classification Search
CPC ... B64C 27/325; B64C 27/20; B64C 29/0025; B64C 13/04; B64C 13/18; B64C 17/02; G05D 1/0858; G05B 11/36
See application file for complete search history.

(56) References Cited

U.S. PATENT DOCUMENTS

| 7,477,951 B2 | 1/2009 | Iwazaki et al. |
| 7,908,044 B2 * | 3/2011 | Piasecki ............... G05D 1/0858 701/4 |

(Continued)

FOREIGN PATENT DOCUMENTS

| JP | 2001-039397 | 2/2001 |
| JP | 2007-001544 | 1/2007 |

(Continued)

OTHER PUBLICATIONS

International Search Report and Written Opinion for International Application No. PCT/JP2019/024119 dated Aug. 20, 2019, 9 pages.
(Continued)

*Primary Examiner* — Ian Jen
(74) *Attorney, Agent, or Firm* — Amin, Turocy & Watson, LLP (57) ABSTRACT

Provided are a flying object control device, a flying object, and a program that can suppress occurrence of unintended turning in the flying object. A flying object control device has: a command value generation unit that generates a turning torque command value on the basis of a turning torque target value which is a target value of turning torque of a flying object; and an external disturbance countermeasure value generation unit that generates an external disturbance countermeasure value in accordance with turning torque generated by external disturbance, on the basis of the turning torque command value generated by the command value generation unit and a sensor detection value acquired by using a sensor provided to the flying object, wherein the command value generation unit generates the turning torque command value by subtracting the external disturbance countermeasure value generated by the external disturbance countermeasure value generation unit from the turning torque target value.

9 Claims, 7 Drawing Sheets

(56) References Cited

U.S. PATENT DOCUMENTS

2012/0158255 A1    6/2012  Takenaka et al.
2013/0299253 A1   11/2013  Takenaka et al.
2018/0290733 A1*  10/2018  Worsham, II ........... B64C 27/82

FOREIGN PATENT DOCUMENTS

| JP | 2008-129813 | 6/2008 |
| JP | 2011-131861 | 7/2011 |
| JP | 2013-125472 | 6/2013 |
| JP | 2013-237325 | 11/2013 |
| WO | 2011/033578 | 3/2011 |

OTHER PUBLICATIONS

Hoversurf, Hoverbike HOVER ONE, Dec. 2, 2020; https://www.hoversurf.com/orderyours; https://www.designboom.com/technology/hoversurf-scorpion-3-hoverbike-02/20/2017/.

* cited by examiner

FLYING OBJECT CONTROL DEVICE, FLYING OBJECT, AND PROGRAM

TECHNICAL FIELD

The present invention relates to an aircraft control apparatus (a flying object control device), an aircraft (a flying object), and a program.

BACKGROUND ART

Japanese Laid-Open Patent Publication No. 2011-131861 discloses causing a vertical takeoff and landing machine to fly in a desired direction, by relatively moving weight while the rider manipulates a handlebar to the front, rear, left, and right. For example, the machine can be made to advance by drawing the handlebar toward the rider, and can be made to turn left by pressing the handlebar forward and to the right.

Furthermore, the Internet site of Hoversurf, Hoverbike HOVER ONE, [Searched Jul. 25, 2018], <URL: www.hoversurf.com/scorpion-3>discloses adjusting the roll angle, pitch angle, yaw rate, altitude, and the like of an aircraft by having a rider manipulate joysticks provided to the left and right of the position of the rider.

SUMMARY OF INVENTION

When a center of mass position of the aircraft changes due to movement of the center of mass of a rider, unintended turning torque acts on the aircraft and can cause the aircraft to undesirably turn.

It is an object of the present invention to provide an aircraft control apparatus, and aircraft, and a program that make it possible to restrict unintended turning of the aircraft.

An aircraft control apparatus according to one aspect of the present invention is an aircraft control apparatus that controls an aircraft including a plurality of rotor wings and a plurality of drive sections that respectively rotate the plurality of rotor wings, the aircraft control apparatus including a command value generating section configured to generate a turning torque command value based on a turning torque target value, which is a target value for a turning torque of the aircraft; and an external disturbance countermeasure value generating section configured to generate an external disturbance countermeasure value corresponding to a turning torque caused by an external disturbance, based on the turning torque command value generated by the command value generating section and a sensor detection value acquired using a sensor included in the aircraft, wherein the command value generating section is configured to generate the turning torque command value by subtracting the external disturbance countermeasure value generated by the external disturbance countermeasure value generating section from the turning torque target value.

An aircraft according to another embodiment of the present invention comprises the aircraft control apparatus described above.

A program according to yet another aspect of the present invention is a program that causes a computer provided to an aircraft, which includes a plurality of rotor wings and a plurality of drive sections that respectively rotate the plurality of rotor wings, to perform a step of generating a turning torque command value based on a turning torque target value, which is a target value for a turning torque of the aircraft; and a step of generating an external disturbance countermeasure value corresponding to a turning torque caused by an external disturbance, based on the turning torque command value and a sensor detection value acquired using a sensor included in the aircraft, wherein the step of generating the turning torque command value includes generating the turning torque command value by subtracting the external disturbance countermeasure value from the turning torque target value.

According to the present invention, it is possible to provide an aircraft control apparatus, and aircraft, and a program that make it possible to restrict unintended turning of an aircraft.

DESCRIPTION OF EMBODIMENTS

The following describes preferred embodiments of an aircraft control apparatus and an aircraft according to the present invention, while referencing the accompanying drawings.

Embodiment

Figure 1:
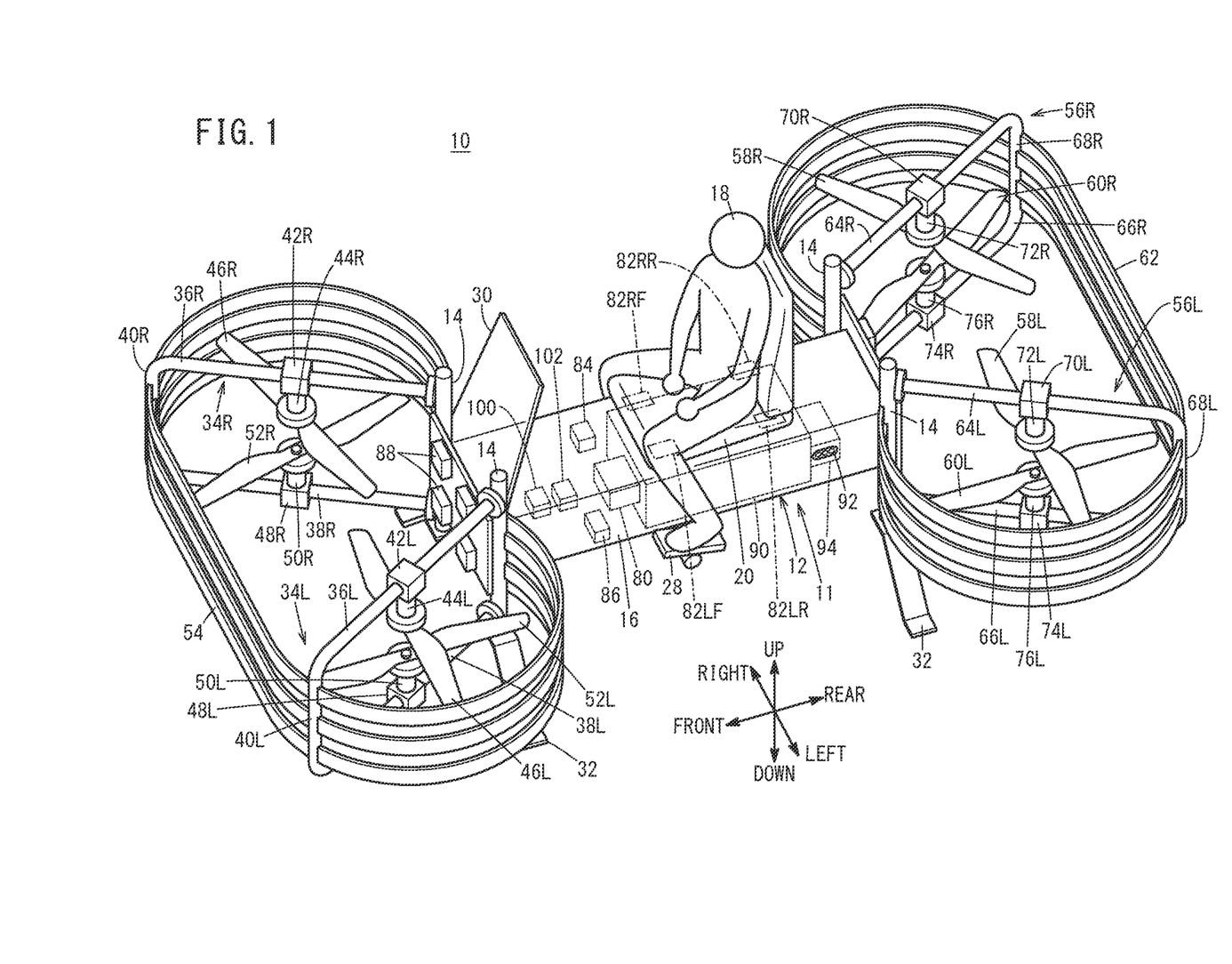
FIG. 1 is a perspective view of an aircraft according to an embodiment.

The following describes an aircraft control apparatus and an aircraft according to an embodiment, using FIG. 1. FIG. 1 is a perspective view of the aircraft according to a first embodiment. Here, a description of an example is given, in which an aircraft 10 according to the present embodiment is a multicopter, but the present invention is not limited to this. The present invention can be applied to various types of aircraft 10.

A machine body 11 of the aircraft 10 includes a main body frame 12, which has a rectangular shape that is long in the front-rear direction. The main body frame 12 includes a skeletal body 14 that is a combination of a plurality of rod-shaped members, such as pipes. External panels 16 are attached to the outside of the skeletal body 14. Some of the skeletal body 14 is exposed outside the external panels 16.

A seat 20 for a rider 18 to sit on is provided on a top portion of the main body frame 12. In the following description, the front-rear direction is the front-rear direction as seen from the rider 18 seated on the seat 20. In the following description, the left-right direction is the left-right direction as seen from the rider 18 seated on the seat 20. In the following description, the up-down direction is the up-down direction as seen from the rider 18 seated on the seat 20. In the following description, there are cases where the letters "L" indicating left and "R" indicating right are appended to reference numerals of configurational elements arranged on the left and right.

Steps 28, where the feet of the rider 18 seated on the seat 20 are placed, are provided on the left and right sides of the main body frame 12. A windshield hood 30, made of a transparent acrylic board or the like, is mounted in front of the seat 20 of the main body frame 12. Leg-shaped landing gears 32 are attached at four locations at the front, rear, left, and right of the main body frame 12.

A left-right pair of front support arms (arm members) 34L and 34R are attached to the front portion of the skeletal body 14. The front support arms 34L and 34R are formed by rod-shaped members such as pipe members. The left-side front support arm 34L includes an upper arm 36L that extends forward and to the left from the top left corner of the skeletal body 14. The left-side front support arm 34L further includes a lower arm 38L that extends forward and to the left, parallel to the upper arm 36L, from the bottom left corner of the skeletal body 14. The left-side front support arm 34L further includes a connection rod 40L that connects a tip portion of the upper arm 36L and a tip portion of the lower arm 38L.

The right-side front support arm 34R includes an upper arm 36R that extends forward and to the right from the top right corner of the skeletal body 14. The right-side front support arm 34R further includes a lower arm 38R that extends forward and to the right, parallel to the upper arm 36R, from the bottom right corner of the skeletal body 14. The right-side front support arm 34R further includes a connection rod 40R that connects a tip portion of the upper arm 36R and a tip portion of the lower arm 38R.

Electric motors (drive sections) 44L and 44R are attached facing downward to an intermediate portion between the left and right upper arms 36L and 36R, via mounting members 42L and 42R. Double-bladed rotor wings 46L and 46R, which rotate centered on output shafts of respective electric motors 44L and 44R that extend downward, are attached horizontally to these output shafts.

Electric motors (drive sections) 50L and 50R are attached facing upward to an intermediate portion between the left and right lower arms 38L and 38R, via mounting members 48L and 48R. Double-bladed rotor wings 52L and 52R, which rotate centered on output shafts of the respective electric motors 50L and 50R that extend upward, are attached horizontally to these output shafts.

A board-shaped front guard member 54 is attached to the front portion of the main body frame 12. The overall front guard member 54 is formed to have an oval shape that is long in the left-right direction. The front guard member 54 is formed to surround the four rotor wings 46L, 46R, 52L, and 52R. Both ends of the front guard member 54 are fixed to the main body frame 12. The connection rods 40L and 40R are connected to the left and right sides of the front portion of the front guard member 54.

A left-right pair of rear support arms (arm members) 56L and 56R, four rotor wings 58L, 58R, 60L, and 60R, and a rear guard member 62 are provided at a rear portion of the skeletal body 14. The left-right pair of rear support arms 56L and 56R have the same configuration as the left-right pair of front support arms 34L and 34R. The four rotor wings 58L, 58R, 60L, and 60R have the same configuration as the four forward rotor wings 46L, 46R, 52L, and 52R. The rear guard member 62 has the same configuration as the front guard member 54.

In other words, the left-right pair of rear support arms (arm members) 56L and 56R are formed by rod-shaped members such as pipe members. The left-side rear support arm 56L includes an upper arm 64L that extends backward and to the left from the top left corner of the skeletal body 14. The left-side rear support arm 56L further includes a lower arm 66L that extends backward and to the left, parallel to the upper arm 64L, from the bottom left corner of the skeletal body 14. The left-side rear support arm 56L further includes a connection rod 68L that connects a tip portion of the upper arm 64L and a tip portion of the lower arm 66L.

The right-side rear support arm 56R includes an upper arm 64R that extends backward and to the right from the top right corner of the skeletal body 14. The right-side rear support arm 56R further includes a lower arm 66R that extends backward and to the right, parallel to the upper arm 64R, from the bottom right corner of the skeletal body 14. The right-side rear support arm 56R further includes a connection rod 68R that connects a tip portion of the upper arm 64R and a tip portion of the lower arm 66R.

Electric motors (drive sections) 72L and 72R are attached facing downward to an intermediate portion between the left and right upper arms 64L and 64R, via mounting members 70L and 70R. Double-bladed rotor wings 58L and 58R, which rotate centered on output shafts of the respective electric motors 72L and 72R that extend downward, are attached horizontally to these output shafts. Electric motors (drive sections) 76L and 76R are attached facing upward to an intermediate portion between the left and right lower arms 66L and 66R, via mounting members 74L and 74R. Double-bladed rotor wings 60L and 60R, which rotate centered on output shafts of the respective electric motors 76L and 76R that extend upward, are attached horizontally to these output shafts.

The board-shaped rear guard member 62 is attached to the rear portion of the main body frame 12. The overall rear guard member 62 is formed to have an oval shape that is long in the left-right direction. The rear guard member 62 is formed to surround the four rotor wings 58L, 58R, 60L, and 60R. Both ends of the rear guard member 62 are fixed to the main body frame 12. The connection rods 68L and 68R are connected to the left and right sides of the rear portion of the rear guard member 62.

The electric motors 44L, 44R, 50L, 50R, 72L, 72R, 76L, and 76R each rotationally drive a corresponding one of the rotor wings 46L, 46R, 52L, 52R, 58L, 58R, 60L, and 60R connected to the output shaft thereof. An actuator 53 is formed by the electric motors 44L, 44R, 50L, 50R, 72L, 72R, 76L, and 76R and the rotor wings 46L, 46R, 52L, 52R, 58L, 58R, 60L, and 60R. The two rotor wings 46L and 52L arranged facing each other in the up-down direction are rotationally driven in opposite directions from each other. The two rotor wings 46R and 52R arranged facing each other in the up-down direction are rotationally driven in opposite directions from each other. The two rotor wings 58L and 60L arranged facing each other in the up-down direction are rotationally driven in opposite directions from each other. The two rotor wings 58R and 60R arranged facing each other in the up-down direction are rotationally driven in opposite directions from each other. The left-side rotor wings 46L, 52L, 58L, and 60L and the right-side rotor wings 46R, 52R, 58R, and 60R are arranged with left-right symmetry relative to a center line extending in the front-rear direction of the main body frame 12. In other words, the aircraft 10 includes pairs of left-right and counter-rotating rotor wings 46L, 46R, 52L, 52R, 58L, 58R, 60L, and 60R arranged with left-right symmetry.

The main body frame 12 includes a control section (aircraft control apparatus) 80 that oversees overall control of the aircraft 10 according to the present embodiment and preforms prescribed control. The main body frame 12 further includes load cells (load sensors) 82LF, 82RF, 82LR, and 82RR. The load cell 82LF is installed in a forward left portion of a region direction below the seat 20. The load cell 82RF is installed in a forward right portion of the region direction below the seat 20. The load cell 82LR is installed in a rear left portion of the region directly below the seat 20. The load cell 82RR is installed in a rear right portion of the region directly below the seat 20.

The main body frame 12 further includes an inertial navigation apparatus (IMU) 84. The IMU 84 includes a gyro sensor, for example. The IMU 84 can detect angular velocity in three axial direction or acceleration in three axial direction. Therefore, the IMU 84 can detect the posture of the aircraft 10.

The main body frame 12 further includes a downward distance sensor 86. The downward distance sensor 86 can detect the altitude of the aircraft 10 from the ground.

The main body frame 12 further includes an angular velocity sensor (sensor) 100 and an angle sensor (sensor) 102. Here, a description of an example is given, in which the angular velocity sensor 100 and the angle sensor 102 are provided separately, but the present invention is not limited to this. The turning angle may be acquired by integrating the turning angular velocity detected using the angular velocity sensor 100. In such a case, the angle sensor 102 is unnecessary. Furthermore, the turning angular velocity may be acquired by differentiating the turning angle detected using the angle sensor 102. In such a case, the angular velocity sensor 100 is unnecessary.

The main body frame 12 includes a plurality of ESCs (Electronic Speed Controllers) 88 (see FIG. 2) that respectively control the electric motors 44L, 44R, 50L, 50R, 72L, 72R, 76L, and 76R. Furthermore, the main body frame 12 includes a battery 90. Yet further, the main body frame 12 includes a battery charger 94 with a connection plug 92.

The control section 80 controls the flight of the aircraft 10 based on manipulations made by the rider 18. Here, a description of an example is given, in which the manipulation of the aircraft 10 is made by movement of the center of mass (center of mass position or weight movement) of the rider 18. The control section 80 controls the advancing direction, advancing velocity, turning direction, turning velocity, and the like of the aircraft 10 based on the center of mass movement of the rider 18 detected using the load cells 82LF, 82RF, 82LR, and 82RR.

As an example, if the rider 18 moves their center of mass forward, the control section 80 controls each of the electric motors 44L, 44R, 50L, 50R, 72L, 72R, 76L, and 76R such that the aircraft 10 flies forward (advancing direction). Furthermore, if the rider 18 moves their center of mass backward, the control section 80 controls each of the electric motors 44L, 44R, 50L, 50R, 72L, 72R, 76L, and 76R such that the aircraft 10 flies backward (reversing direction). The control section 80 makes the advancing velocity of the aircraft 10 higher as the center of mass movement amount of the rider 18 becomes greater.

If the rider 18 moves their center of mass to the right, the control section 80 controls each of the electric motors 44L, 44R, 50L, 50R, 72L, 72R, 76L, and 76R such that the aircraft 10 flies to the right side (rightward direction). If the rider 18 moves their center of mass to the left, the control section 80 controls each of the electric motors 44L, 44R, 50L, 50R, 72L, 72R, 76L, and 76R such that the aircraft 10 flies to the left side (leftward direction). The control section 80 makes the advancing velocity of the aircraft 10 higher as the center of mass movement amount of the rider 18 becomes greater.

If the rider 18 moves their center of mass to the left in a state where the aircraft 10 is advancing, the control section 80 operates as described below. That is, in such a case, the control section 80 controls each of the electric motors 44L, 44R, 50L, 50R, 72L, 72R, 76L, and 76R such that the aircraft 10 advances while curving leftward. At this time, the control section 80 causes the curve to become tighter as the leftward center of mass movement amount of the rider 18 becomes greater. If the rider 18 moves their center of mass to the right in a state where the aircraft 10 is advancing, the control section 80 operates as described below. That is, in such a case, the control section 80 controls each of the electric motors 44L, 44R, 50L, 50R, 72L, 72R, 76L, and 76R such that the aircraft 10 advances while curving rightward. At this time, the control section 80 causes the curve to become tighter as the rightward center of mass movement amount of the rider 18 becomes greater.

At a time when the aircraft 10 is advancing while curving leftward, when the center of mass position of the rider 18 returns to a position on a center line of the aircraft 10 in the longitudinal direction, the control section 80 controls the flight of the aircraft 10 such that the aircraft 10 advances straight forward. At a time when the aircraft 10 is advancing while curving rightward, when the center of mass position of the rider 18 returns to a position on the center line of the aircraft 10 in the longitudinal direction, the control section 80 controls the flight of the aircraft 10 such that the aircraft 10 advances straight forward.

If the aircraft 10 is flying in the advancing direction, when the center of mass position of the rider 18 returns to a reference position, the control section 80 causes a deceleration force in a reversing direction to act on the aircraft 10, i.e., the machine body 11, such that the velocity of the aircraft 10 becomes 0. The reference position is a center of mass position of the rider 18 at the time when the rider 18 is sitting on the seat 20 with an ideal posture. Furthermore, if the aircraft 10 is flying in the reversing direction, when the center of mass position of the rider 18 returns to the reference position, the control section 80 causes a deceleration force in a reversing direction to act on the aircraft 10 such that the velocity of the aircraft 10 becomes 0. In the present embodiment, the velocity of the aircraft 10 is brought to 0 by causing a decelerating force greater than or equal to the air resistance value to act on the aircraft 10. The state in which the velocity is 0 is a state in which the aircraft 10 is stopped in mid-air at a prescribed altitude, i.e., a hovering state.

Figure 2:
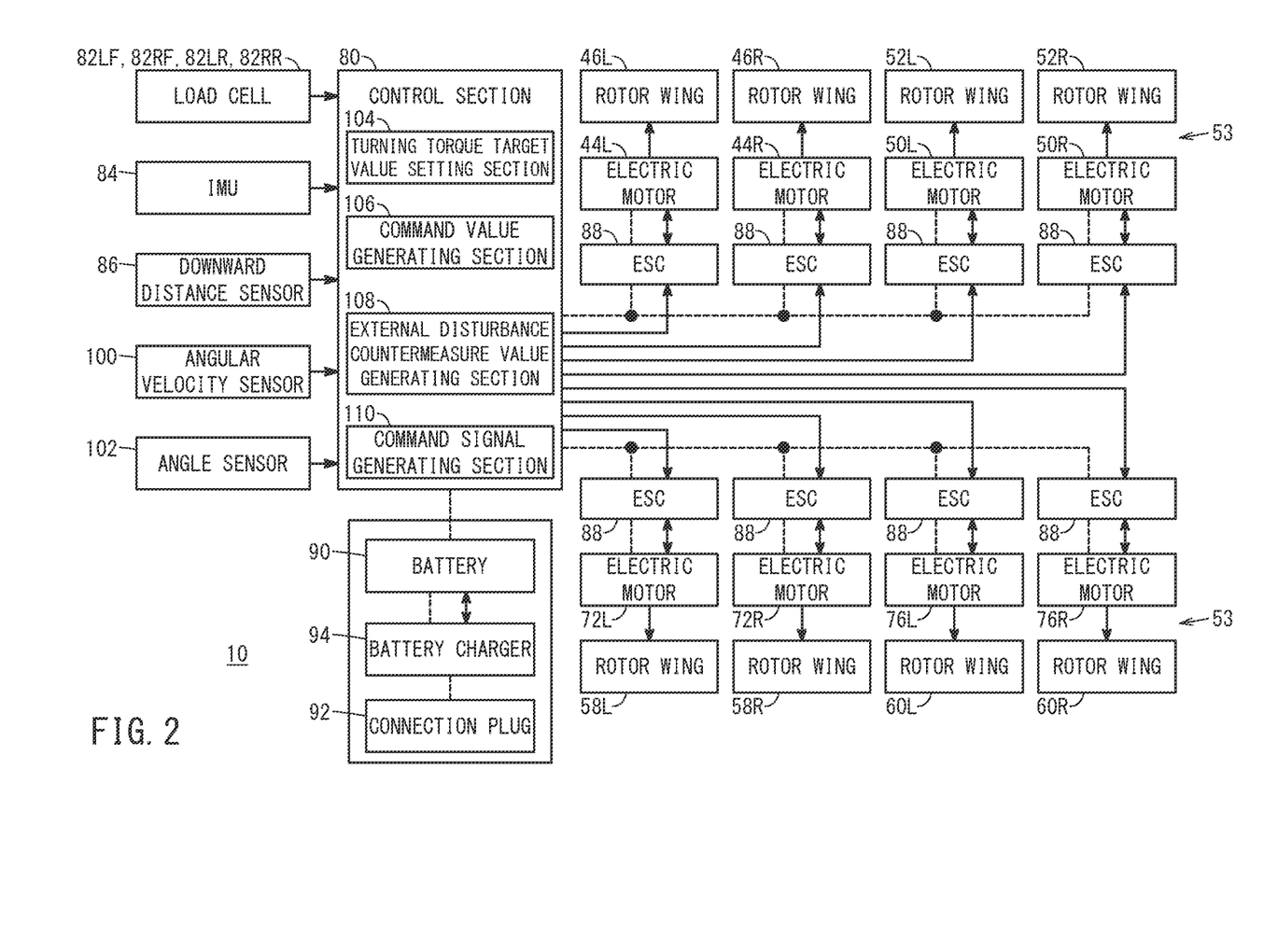
FIG. 2 is a block diagram showing the aircraft according to the embodiment.

FIG. 2 is a block diagram of the aircraft according to the present embodiment. In FIG. 2, the solid lines indicate signal lines and the dashed lines indicate power lines.

The control section 80 includes a turning torque target value setting section 104, a command value generating section 106, an external disturbance countermeasure value generating section 108, and a command signal generating section 110. The control section 80 includes other configurational elements as well, but in order to simplify the description, these other configurational elements are not shown in the drawings.

The turning torque target value setting section 104 sets a target value (turning torque target value) for the turning torque of the aircraft 10. The turning torque target value in a steady state is 0, for example. The turning torque target value setting section 104 sets the turning torque target value according to the center of mass movement of the rider 18 detected using the load cells 82LF, 82RF, 82LR, and 82RR, for example.

The command value generating section 106 generates a turning torque command value by subtracting an external disturbance countermeasure value (external disturbance turning torque countermeasure value) generated by the external disturbance countermeasure value generating section 108 from the turning torque target value set by the turning torque target value setting section 104. The external disturbance countermeasure value is a value corresponding to the turning torque caused by an external disturbance, that is, a value corresponding to the external disturbance turning torque.

An external disturbance is a change in the center of mass position of the aircraft 10 caused by movement of the center of mass of the rider 18, for example. As an example, when the rider 18 moves their center of mass in order to control the aircraft 10, an external disturbance turning torque can occur in the aircraft 10. Furthermore, in a case where the center of mass position of the rider 18 shifts from the reference position, this can cause an external disturbance turning torque to occur in the aircraft 10. The external disturbance is not limited to a change in the center of mass position of the aircraft 10 caused by movement of the center of mass of the rider 18, and may also include a case of a change in the center of mass position of the aircraft 10 caused by wind or the like, for example. As an example, if the aircraft 10 has been blown by wind, a turning torque caused by an external disturbance can occur in the aircraft 10.

The external disturbance countermeasure value generating section 108 generates the external disturbance countermeasure value based on the turning torque command value generated by the command value generating section 106 and the turning angular velocity (sensor detection value) acquired using the angular velocity sensor 100.

The command signal generating section 110 supplies each ESC 88 with the command signal for rotating the respective electric motors 44L, 44R, 50L, 50R, 72L, 72R, 76L, and 76R such that a turning torque corresponding to the turning torque command value is applied to the aircraft 10. The command signal generating section 110 can also generate a command value that is different from the turning torque command value supplied from the command value generating section 106, that is, a command signal corresponding to a command value supplied from a configurational element other than the command value generating section 106. However, here, a description concerning the generation of a command signal corresponding to a command value other than the turning torque command value is omitted.

The control section 80 can calculate the pitch angle (rotational angle on an axis in the left-right direction), the velocity, and the like of the aircraft 10, based on the detection results of the IMU 84. Instead of or in addition to the IMU 84, a wind velocity sensor, a GPS sensor, an infrared camera, an RGB camera, a millimeter wave radar, and the like may be loaded in the aircraft 10. Furthermore, instead of or in addition to the IMU 84, LIDAR (Light Detection and Ranging, Laser Imaging Detection and Ranging) or the like may be loaded in the aircraft 10. In such cases, the pitch angle, velocity, and the like may be obtained based on the detection results of these detection means.

Each ESC 88 drives the corresponding electric motor 44L, 44R, 50L, 50R, 72L, 72R, 76L, or 76R based on the command signal received from the command signal generating section 110. In this way, each rotor wing 46L, 46R, 52L, 52R, 58L, 58R, 60L, and 60R is rotationally driven in an individual rotational direction with an individual rotational velocity. As a result, even if turning torque caused by an external disturbance, i.e., an external disturbance turning torque, occurs, it is possible to apply a turning torque that cancels out this external disturbance turning torque to the aircraft 10, thereby making it possible to restrict turning of the aircraft 10. Furthermore, by suitably rotating each of the rotor wings 46L, 46R, 52L, 52R, 58L, 58R, 60L, and 60R, the aircraft 10 can be made to fly in the desired direction with the desired velocity. Yet further, by suitably rotating each of the double-bladed rotor wings 46L, 46R, 52L, 52R, 58L, 58R, 60L, and 60R, the aircraft 10 can be made to turn in the desired direction.

If the aircraft 10 is to turn left, the rotational velocities of the electric motors that rotate clockwise among the electric motors 44L, 44R, 50L, 50R, 72L, 72R, 76L, and 76R are set to be higher than the rotational velocities of the electric motors that rotate counter-clockwise. If the aircraft 10 is to turn right, the rotational velocities of the electric motors that rotate counter-clockwise among the electric motors 44L, 44R, 50L, 50R, 72L, 72R, 76L, and 76R are set to be higher than the rotational velocities of the electric motors that rotate clockwise.

If the aircraft 10 is to decelerate, the rotational velocities of one set of electric motors among the front and rear electric motors 44L, 44R, 50L, 50R, 72L, 72R, 76L, and 76R are set to be lower than the rotational velocities of the other set of electric motors. For example, if the aircraft 10 is to decelerate while flying in the advancing direction, the rotational velocities of the rear electric motors 72L, 72R, 76L, and 76R should be set to be lower than the rotational velocities of the front electric motors 44L, 44R, 50L, and 50R.

Figure 3:
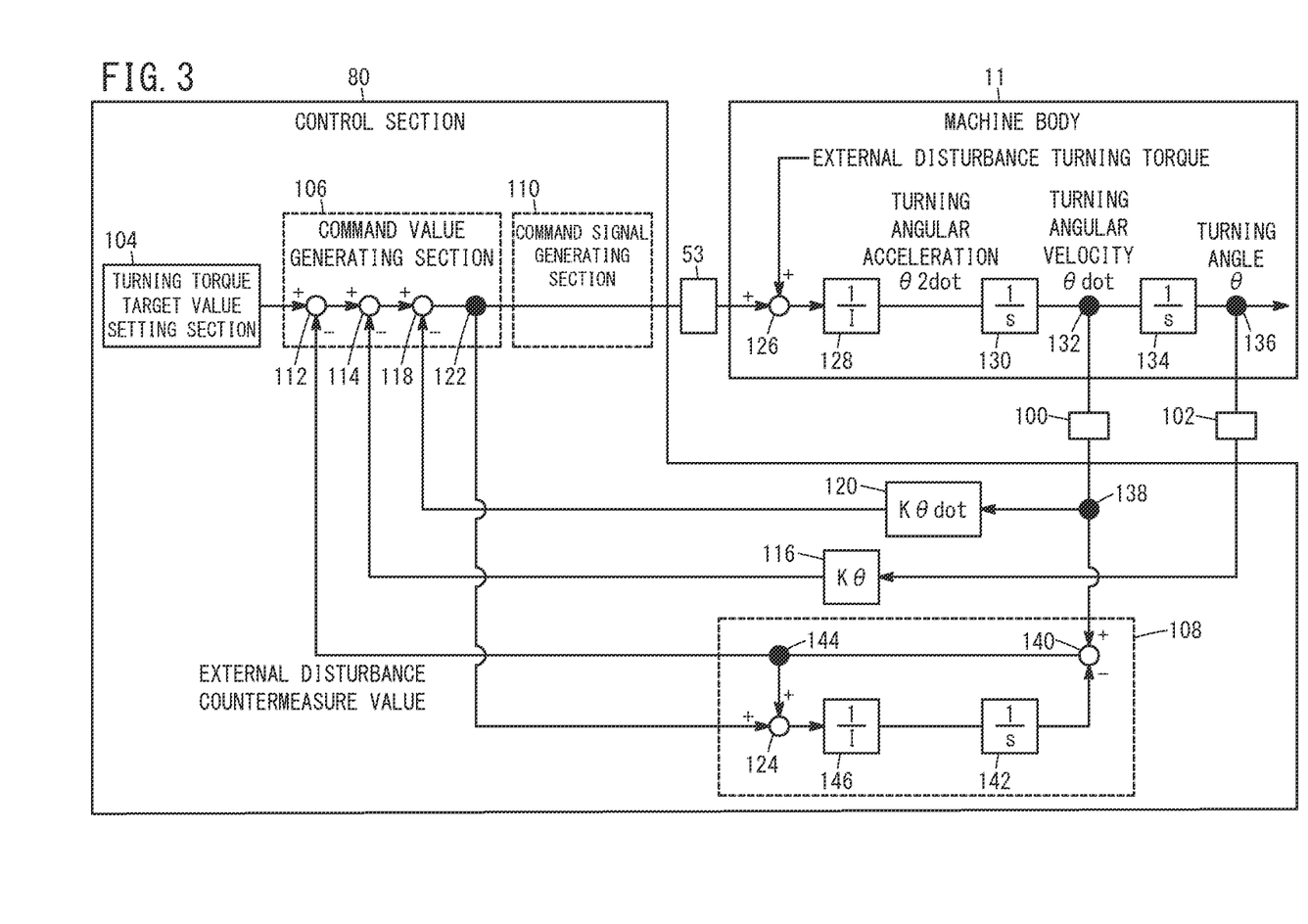
FIG. 3 is a block diagram showing a portion of the aircraft according to the embodiment.

FIG. 3 is a block diagram showing a portion of the aircraft according to the present embodiment.

The turning torque target value setting section 104 sets the target value for the turning torque of the aircraft 10, i.e., the turning torque target value. In a steady state, the turning torque target value is 0, for example. The turning torque target value setting section 104 sets the turning torque target value according to the center of mass movement of the rider 18 detected using the load cells 82LF, 82RF, 82LR, and 82RR, for example.

The turning torque target value set by the turning torque target value setting section 104 is supplied to the command value generating section 106. The command value generating section 106 subtracts the external disturbance countermeasure value generated by the external disturbance countermeasure value generating section 108 from the turning torque target value (adding point 112).

The turning angle acquired using the angle sensor 102 is input to a gain element 116 whose gain (control gain) is Kθ. The gain element 116 multiplies the turning angle detected using the angle sensor 102 by the gain Kθ, and supplies the calculation result obtained in this manner to the command value generating section 106. The command value generating section 106 further subtracts the calculation result obtained by the gain element 116 from the turning torque target value (adding point 114).

The turning angular velocity detected using the angular velocity sensor 100 is input to a gain element 120 whose gain (control gain) is Kθdot. The gain element 120 multiplies the turning angular velocity detected using the angular velocity sensor 100 by the gain Kθdot, and supplies the calculation result obtained in this manner to the command value generating section 106. The command value generating section 106 further subtracts the calculation result obtained by the gain element 120 from the turning torque target value (adding point 118). In this way, the turning torque command value is generated by the command value generating section 106. The turning torque command value generated by the command value generating section 106 is supplied to the command signal generating section 110 and the external disturbance countermeasure value generating section 108 (withdrawal point 122).

The command signal generating section 110 generates the command signal based on the signal supplied from the command value generating section 106, i.e., the turning torque command value. The command signal generating section 110 supplies each ESC 88 with a command signal causing the electric motors 44L, 44R, 50L, 50R, 72L, 72R, 76L, and 76R to rotate in a manner to apply a turning torque corresponding to the turning torque command value to the aircraft 10, i.e., the machine body 11. In this way, the actuator 53 is driven in a manner to apply a turning torque corresponding to the turning torque command value to the aircraft 10. As described above, the actuator 53 is formed by the electric motors 44L, 44R, 50L, 50R, 72L, 72R, 76L, and 76R and the rotor wings 46L, 46R, 52L, 52R, 58L, 58R, 60L, and 60R.

FIG. 3 shows an adding point 126, a dividing element 128, an integrating element 130, a withdrawal point 132, an integrating element 134, and a withdrawal point 136, but these configurational elements are virtual and not implemented physically. However, in order to facilitate understanding, the description is provided using these virtual configurational elements.

The aircraft 10 turns (adding point 126) due to a combined value (combined torque) that is a combination of the turning torque applied to the aircraft 10 by the actuator 53 and the external disturbance turning torque. When the combined torque causing the aircraft 10 to turn is divided by the inertial moment I (dividing element 128) of the aircraft 10, the result is a turning angular acceleration $\theta 2dot$. When the turning angular acceleration $\theta 2dot$ is integrated (integrating element 130), the result is the turning angular velocity $\theta dot$. This turning angular velocity $\theta dot$ is detected by the angular velocity sensor 100. When the turning angular velocity $\theta dot$ is integrated (integrating element 134), the result is the turning angle $\theta$. This turning angle $\theta$ is detected by the angle sensor 102.

The turning angular velocity $\theta dot$ detected using the angular velocity sensor 100 is multiplied by the gain $K\theta dot$ by the gain element 120, as described above. The calculation result obtained in this way is supplied to the command value generating section 106 (adding point 118).

The turning angle $\theta$ detected using the angle sensor 102 is multiplied by the gain $K\theta$ by the gain element 116, as described above. The calculation result obtained in this way is supplied to the command value generating section 106 (adding point 114).

The turning angular velocity $\theta dot$ detected using the angular velocity sensor 100 is also supplied to the external disturbance countermeasure value generating section 108 (adding point 138).

The external disturbance countermeasure value generating section 108 further includes an integrating element 142. The external disturbance countermeasure value generating section 108 obtains the external disturbance countermeasure value (adding point 140) by subtracting the calculation result realized by the integrating element 142 from the turning angular velocity $\theta dot$ detected using the angular velocity sensor 100. In this way, the external disturbance countermeasure value is obtained by the external disturbance countermeasure value generating section 108.

The external disturbance countermeasure value generated by the external disturbance countermeasure value generating section 108 is supplied to the command value generating section 106 (adding point 112). Furthermore, the external disturbance countermeasure value generated by the external disturbance countermeasure value generating section 108 and the turning torque command value generated by the command value generating section 106 are added together by the external disturbance countermeasure value generating section 108 (withdrawal point 144 and adding point 124).

The external disturbance countermeasure value generating section 108 further includes a dividing element 146. The dividing element 146 divides a value, which is obtained by adding together the external disturbance countermeasure value generated by the external disturbance countermeasure value generating section 108 and the turning torque command value generated by the command value generating section 106, by the inertial moment I of the aircraft 10.

The calculation result realized by the dividing element 146 is input to the integrating element 142. The integrating element 142 integrates the calculation result realized by the dividing element 146. As described above, the external disturbance countermeasure value is obtained (adding point 140) by subtracting the calculation result realized by the integrating element 142 from the turning angular velocity $\theta dot$ (sensor detection value) detected using the angular velocity sensor 100. In this way, the external disturbance countermeasure value is generated by subtracting the value corresponding to the turning torque command value and the value corresponding to the external disturbance countermeasure value already obtained by the external disturbance countermeasure value generating section 108 from the sensor detection value detected using the angular velocity sensor 100.

In this way, according to the present embodiment, the external disturbance countermeasure value corresponding to the turning torque caused by an external disturbance (external disturbance turning torque) is generated by the external disturbance countermeasure value generating section 108. The turning torque command value is then generated by subtracting the external disturbance countermeasure value from the turning torque target value. Since the external disturbance countermeasure value is subtracted from the turning torque target value, a turning torque command value in which the external disturbance turning torque is canceled out is generated. Therefore, according to the present embodiment, it is possible to provide the aircraft control apparatus 80 and the aircraft 10 that can effectively restrict turning caused by an external disturbance.

Figure 4:
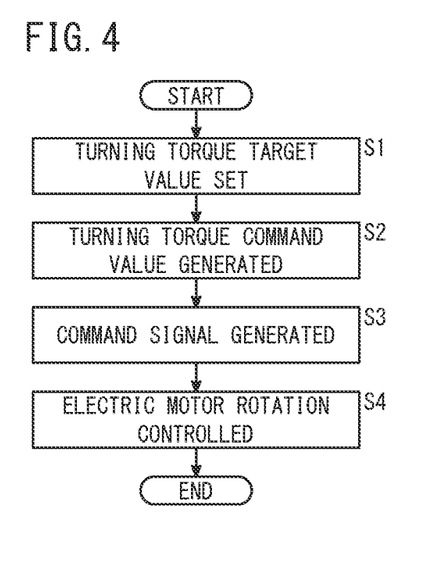
FIG. 4 is a flow chart showing the operation of an aircraft control apparatus according to the embodiment.

FIG. 4 is a flow chart showing the operation of the aircraft control apparatus according to the present embodiment.

At step S1, the turning torque target value setting section 104 sets the turning torque target value. As described above, the turning torque target value in the steady state is 0, for example. The turning torque target value can be set according to the center of mass movement of the rider 18 detected using the load cells 82LF, 82RF, 82LR, and 82RR, for example.

At step S2, the command value generating section 106 generates the turning torque command value. When generating the turning torque command value, the external disturbance countermeasure value (external disturbance turning torque countermeasure value) generated by the external disturbance countermeasure value generating section 108 is subtracted from the turning torque target value set by the turning torque target value setting section 104. Furthermore, the value obtained by multiplying the turning angular velocity $\theta dot$ acquired using the angular velocity sensor 100 by the gain $K\theta dot$ is also subtracted from the turning torque target value. Yet further, the value obtained by multiplying the turning angle $\theta$ acquired using the angle sensor 102 by the gain $K\theta$ is also subtracted from the turning torque target value. In this way, the turning torque command value is generated by the command value generating section 106.

At step S3, the command signal generating section 110 generates the command signal based on the turning torque command value generated by the command value generating section 106. The command signal generating section 110 generates the command signal causing the electric motors 44L, 44R, 50L, 50R, 72L, 72R, 76L, and 76R to rotate in a manner to apply a turning torque corresponding to the turning torque command value to the aircraft 10.

At step S4, the command signal generating section 110 supplies each ESC 88 with the generated command signal. Due to this, the electric motors 44L, 44R, 50L, 50R, 72L, 72R, 76L, and 76R rotate in a manner to apply a turning torque corresponding to the turning torque command value to the aircraft 10. In this way, the turning torque corresponding to the turning torque command value is applied to the aircraft 10. As described above, when generating the turning torque command value, the external disturbance countermeasure value is subtracted from the turning torque target value. Since the external disturbance countermeasure value is subtracted from the turning torque target value, a turning torque command value in which the external disturbance turning torque is cancelled out is generated. Therefore, according to the present embodiment, it is possible to effectively restrict turning of the aircraft 10 caused by external disturbance.

(First Modification)

Figure 5:
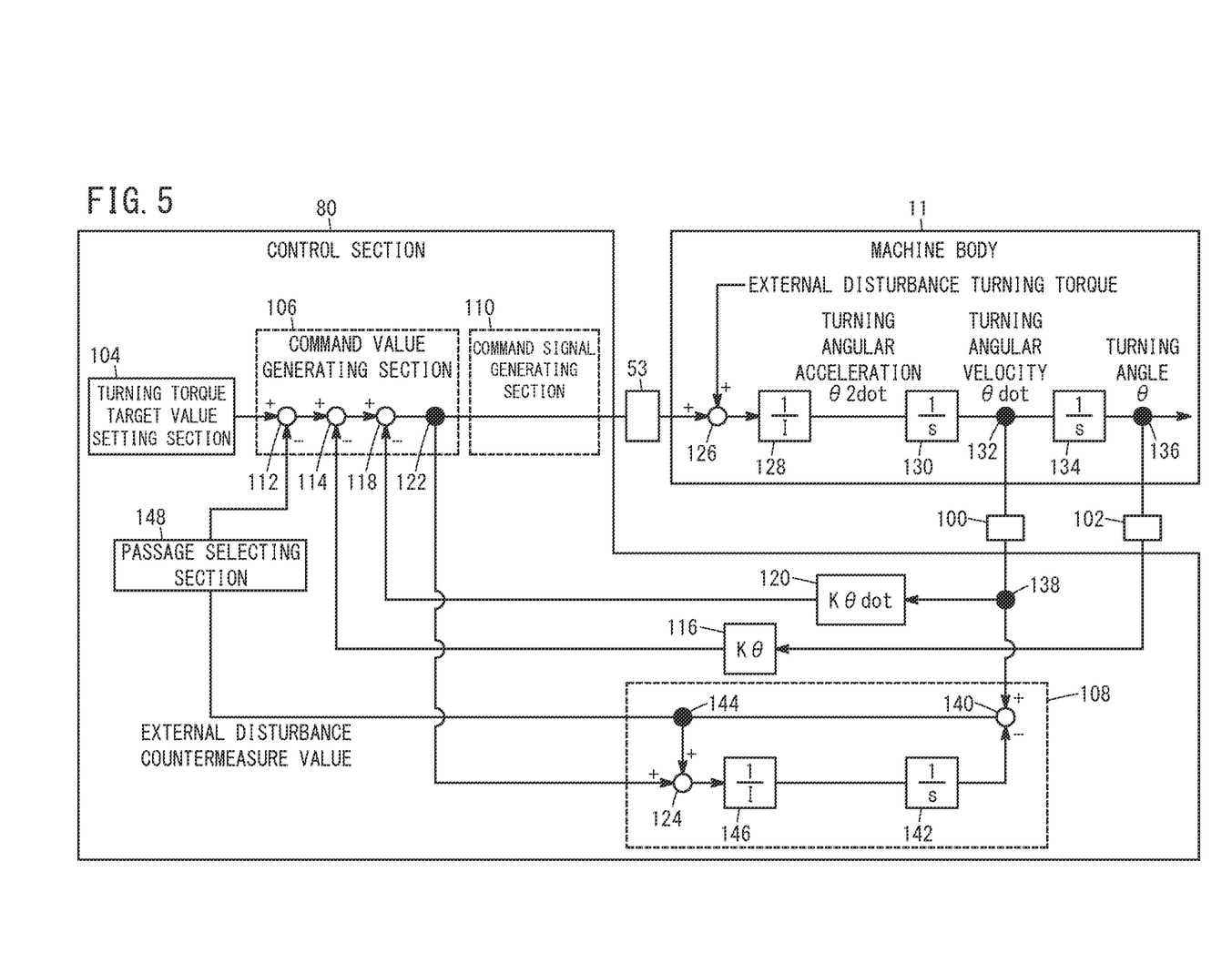
FIG. 5 is a block diagram showing a portion of an aircraft according to a first modification of the embodiment.

An aircraft control apparatus and an aircraft according to a first modification of the present embodiment are described using FIG. 5. FIG. 5 is a block diagram showing a portion of the aircraft according to the present modification.

As shown in FIG. 5, in the present modification, a passage selecting section 148 is included between the external disturbance countermeasure value generating section 108 and the command value generating section 106. If the sign of the turning torque target value and the sign of the external disturbance countermeasure value are the same, the passage selecting section 148 supplies the command value generating section 106 with the external disturbance countermeasure value generated by the external disturbance countermeasure value generating section 108. On the other hand, if the sign of the turning torque target value and the sign of the external disturbance countermeasure value are different from each other, the passage selecting section 148 does not supply the command value generating section 106 with the external disturbance countermeasure value generated by the external disturbance countermeasure value generating section 108.

According to the present modification, since the command value generating section 106 is supplied with the external disturbance countermeasure value generated by the external disturbance countermeasure value generating section 108 if the sign of the turning torque target value and the sign of the external disturbance countermeasure value are the same, the following occurs. That is, in such a case, when the turning torque command value is being generated, the external disturbance countermeasure value is subtracted from the turning torque target value. Since the external disturbance countermeasure value is subtracted from the turning torque target value, a turning torque command value in which the external disturbance turning torque is cancelled out is generated. Furthermore, according to the present modification, since the command value generating section 106 is not supplied with the external disturbance countermeasure value generated by the external disturbance countermeasure value generating section 108 if the sign of the turning torque target value and the sign of the external disturbance countermeasure value are different from each other, the following occurs. That is, in such a case, a turning torque caused by an external disturbance is utilized when the control section 80 intentionally causes the aircraft 10 to turn.

(Second Modification)

Figure 6:
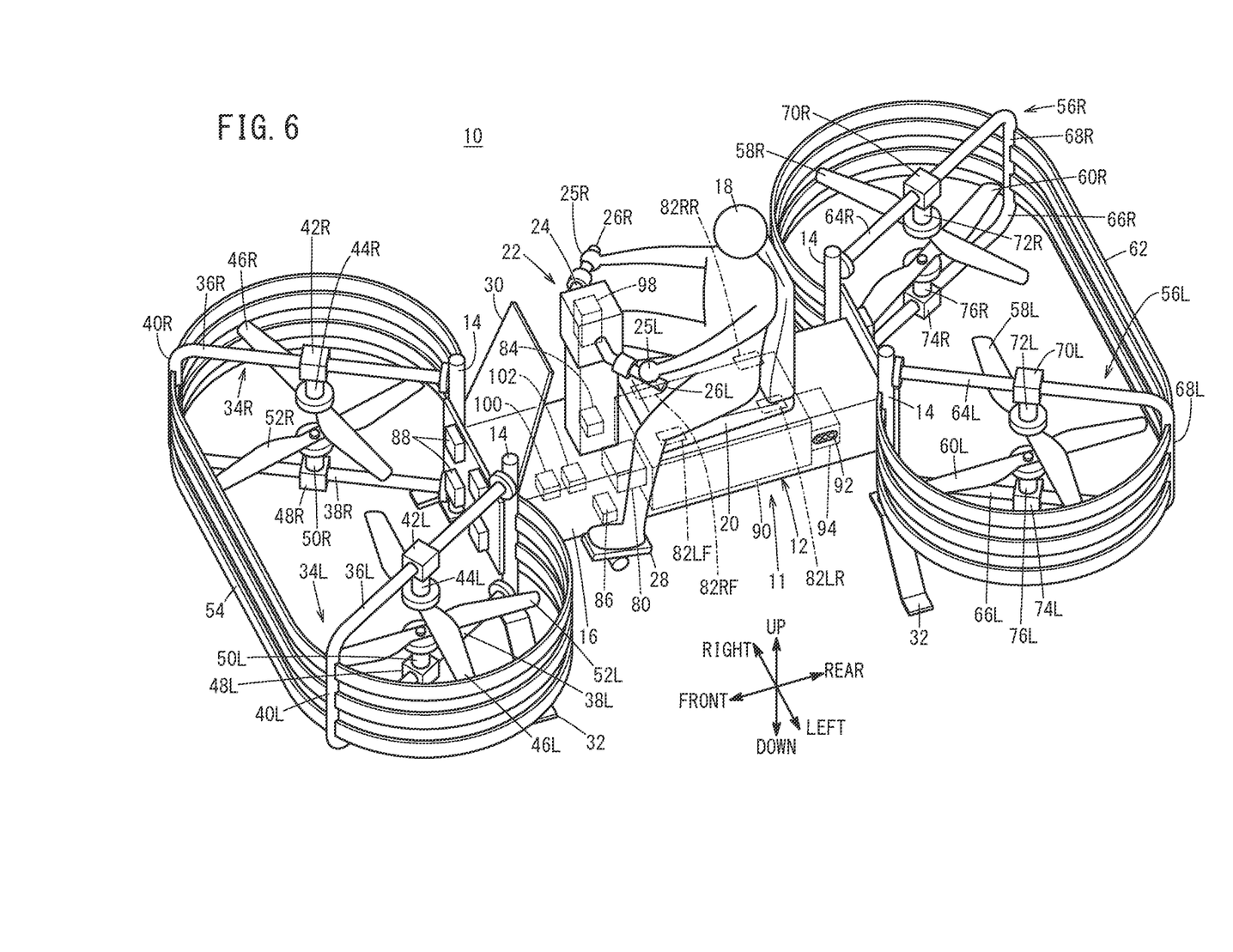
FIG. 6 is a perspective view of an aircraft according to a second modification of the embodiment.
Figure 7:
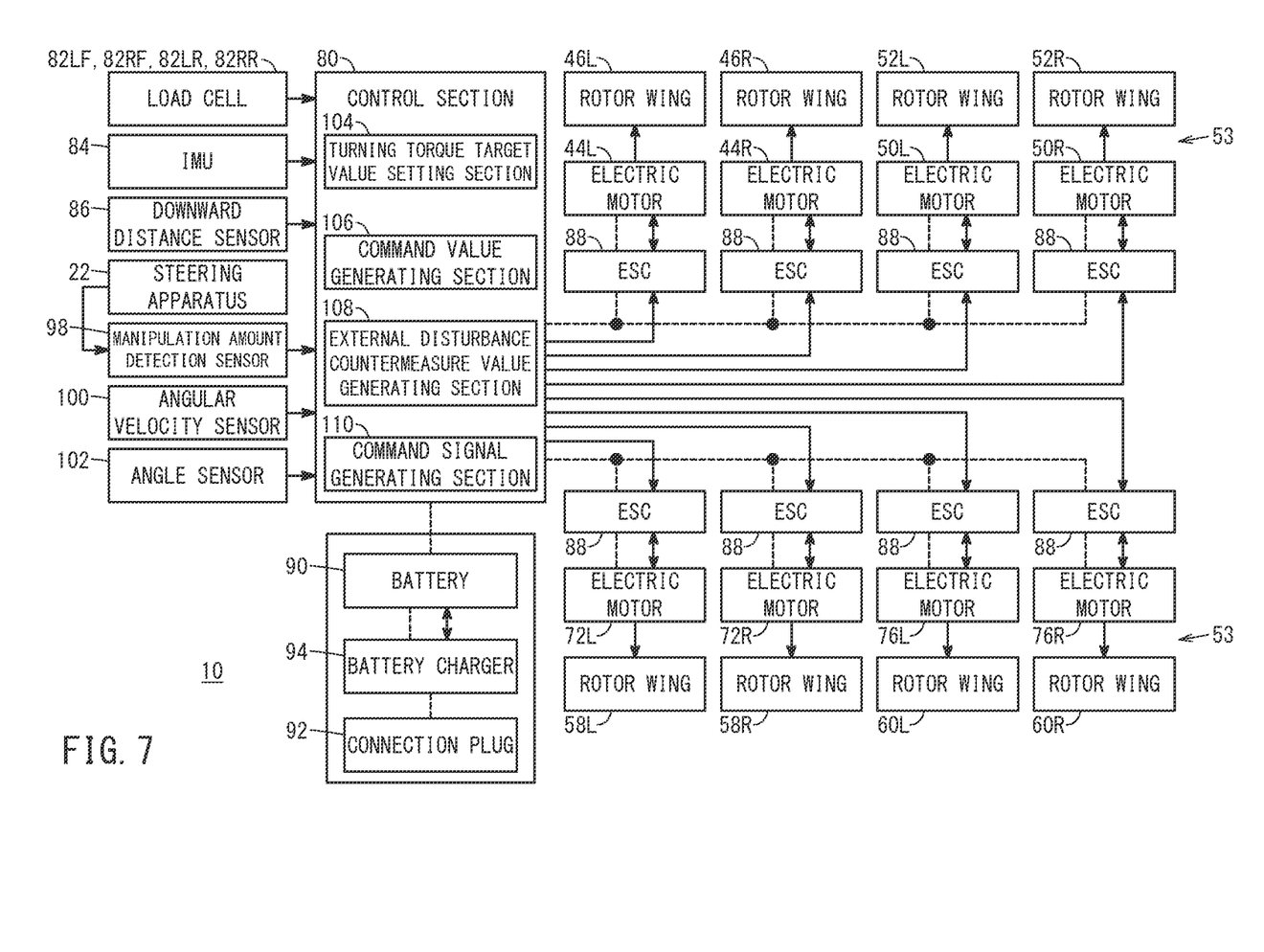
FIG. 7 is a block diagram of the aircraft according to the second modification of the embodiment.

An aircraft control apparatus and an aircraft according to a second modification of the present embodiment are described using FIGS. 6 and 7. FIG. 6 is a perspective view of the aircraft according to the present modification. FIG. 7 is a block diagram showing the aircraft according to the present modification.

The aircraft 10 according to the present modification has its flight controlled by a manipulation apparatus 22.

The manipulation apparatus 22 is provided in front of the seat 20. The manipulation apparatus 22 includes a steering handlebar 24 that can be steered by the rider 18. Handlebar grips (manipulating sections) 26L and 26R, which are gripped by a left hand 25L and a right hand 25R of the rider 18, are provided at the left and right end portions of the steering handlebar 24. The manipulation apparatus 22 includes a manipulation amount detection sensor 98. A torque sensor, a rotational angle sensor, or the like, for example, is used as the manipulation amount detection sensor 98. The manipulation amount detection sensor 98 can detect the manipulation amount of the handlebar grip 26R and the steering angle of the steering handlebar 24.

If the rider 18 manipulates the steering handlebar 24 or the handlebar grip 26R, the following occurs. That is, the control section 80 controls each of the electric motors 44L, 44R, 50L, 50R, 72L, 72R, 76L, and 76R according to the manipulation amount of the steering handlebar 24 or the handlebar grip 26R. In this way, the flight of the aircraft 10 is controlled.

As an example, in a state where the rider 18 has gripped the handlebar grips 26L and 26R with their left hand 25L and right hand 25R, when the steering handlebar 24 is steered around an axis in the up-down direction, i.e., steered in the yaw direction, the aircraft 10 can be made to turn. As another example, when the rider 18 pivots the right-side handlebar grip 26R toward themselves from a neutral position (neutral point) (not shown in the drawings) with their right hand 25R, the aircraft 10 can be made to fly forward (advancing direction). Furthermore, when the rider 18 pivots the right-side handlebar grip 26R away from themselves from a neutral position, the aircraft 10 can be made to fly backward (reversing direction).

As described above, the manipulation amount detection sensor 98 that is formed by a torque sensor or rotational angle sensor is housed in the manipulation apparatus 22. The manipulation amount detection sensor 98 detects the pivoting angle of the handlebar grip 26R relative to the neutral position, as the manipulation amount (position) of the handlebar grip 26R caused by the rider 18. Furthermore, when the rider 18 steers the steering handlebar 24 around the axis in the up-down direction, the manipulation amount detection sensor 98 detects the steering angle of the steering handlebar 24 relative to the neutral position. The control section 80 can control the flight of the aircraft 10 based on the manipulation amount and the steering angle detected by the manipulation amount detection sensor 98.

In a state where the rider 18 pivots the right-side handlebar grip 26R, when the rider 18 removes their right hand 25R from the handlebar grip 26R, for example, the rider 18 and the handlebar grip 26R enter a non-contact state. In this case, the handlebar grip 26R is released from the grip of the right hand 25R, and therefore returns toward the neutral position due to a spring or the like (not shown in the drawings).

If the aircraft 10 is flying in the advancing direction, when the position of the handlebar grip 26R is moved to a neutral region, the control section 80 causes a decelerating force in the reversing direction to act on the aircraft 10, such that the velocity of the aircraft 10 becomes 0. If the aircraft 10 is flying in the reversing direction, when the position of the handlebar grip 26R is moved to a neutral region, the control section 80 causes an decelerating force in the advancing direction to act on the aircraft 10, such that the velocity becomes 0.

The turning torque target value setting section 104 can set the target value of the turning torque of the aircraft 10 based on the signal supplied from the manipulation amount detection sensor 98, specifically the signal indicating the steering angle of the steering handlebar 24.

The control section 80 can determine the deceleration of the aircraft 10 according to the manipulation amount (position) of the handlebar grip 26R in the neutral region and the return amount, the return velocity, or the return acceleration of the handlebar grip 26R returning to the neutral region. For example, in a case where the position of the handlebar grip 26R has been significantly returned to the neutral region by the right hand 25R of the rider 18, the control section 80 judges that the rider 18 is intending to decelerate, and may set the deceleration to be greater the larger this return amount, return velocity, or return acceleration is. Furthermore, the control section 80 may set the deceleration to be greater the smaller the manipulation amount of the handlebar grip 26R in the neutral region is or the closer the position of the handlebar grip 26R in the neutral region is to the neutral position. In this way, when the handlebar grip 26R has returned to the neutral position side, the velocity can be quickly made to be 0. The state in which the velocity is 0 refers to a hovering state in which the aircraft 10 is stopped at a prescribed altitude in the air.

The manipulation apparatus 22 is not limited to the steering handlebar 24 such as shown in FIG. 6. As an example, the manipulation apparatus 22 may be formed by a lever (manipulating section) that simulates the flight stick of an aircraft.

In this way, the flight of the aircraft 10 may be controlled by the manipulation apparatus 22.

Modified Embodiments

Preferred embodiments of the present invention have been described above, but the present invention is not limited to the above-described embodiments, and it goes without saying that various modifications could be adopted therein without departing from the essence and gist of the present invention.

For example, in the above embodiments, integrating elements, gain elements, differentiating elements, and the like may be suitably added between the adding point 140 and the withdrawal point 144.

Furthermore, in the above embodiments, integrating elements, gain elements, differentiating elements, and the like may be suitably added between the withdrawal point 144 and the command value generating section 106.

In the above embodiments, a description of an example has been given, in which the turning angular velocity is used when generating the external disturbance countermeasure value with the external disturbance countermeasure value generating section 108, but the present invention is not limited to this. The turning angle may be used when generating the external disturbance countermeasure value with the external disturbance countermeasure value generating section 108. In such a case, another integrating element may be added at a stage after the integrating element 142, for example.

Furthermore, in such a case, gain elements, differentiating elements, and the like may be suitably added between the adding point 140 and the withdrawal point 144.

The following is a summary of the embodiments described above.

The aircraft control apparatus (80), which controls the aircraft (10) including the plurality of rotor wings (46L, 46R, 52L, 52R, 58L, 58R, 60L, 60R) and the plurality of drive sections (44L, 44R, 50L, 50R, 72L, 72R, 76L, 76R) that respectively rotate the plurality of rotor wings, includes the command value generating section (106) configured to generate a turning torque command value based on a turning torque target value, which is a target value for a turning torque of the aircraft; and the external disturbance countermeasure value generating section (108) configured to generate an external disturbance countermeasure value corresponding to the turning torque caused by an external disturbance, based on the turning torque command value generated by the command value generating section and a sensor detection value acquired using the sensor (100) included in the aircraft, wherein the command value generating section is configured to generate the turning torque command value by subtracting the external disturbance countermeasure value generated by the external disturbance countermeasure value generating section from the turning torque target value. According to this configuration, the external disturbance countermeasure value corresponding to the turning torque caused by an external disturbance is generated by the external disturbance countermeasure value generating section. The turning torque command value is then generated by subtracting the external disturbance countermeasure value from the turning torque target value. Since the external disturbance countermeasure value is subtracted from the turning torque target value, a turning torque command value in which the external disturbance turning torque is canceled out is generated. Therefore, according to this configuration, it is possible to provide the aircraft control apparatus and the aircraft that can effectively restrict turning caused by external disturbance.

The external disturbance countermeasure value generating section may be configured to generate the external disturbance countermeasure value by subtracting, from the sensor detection value, a value corresponding to the turning torque command value and a value corresponding to an external disturbance countermeasure value already acquired by the external disturbance countermeasure value generating section.

The aircraft control apparatus may further comprise the turning torque target value setting section (104) configured to set the turning torque target value, wherein the turning torque target value setting section may be configured to set the turning torque target value based on movement of a center of mass of the rider (18).

The aircraft control apparatus may further comprise the turning torque target value setting section configured to set the turning torque target value, and the turning torque target value setting section is configured to set the turning torque target value based on a manipulation amount of the manipulation apparatus (22) caused by the rider.

The external disturbance may be a change in a position of a center of mass of the aircraft caused by movement of a center of mass of a rider or a change in the position of the center of mass of the aircraft caused by wind.

If a sign of the turning torque target value and a sign of the external disturbance countermeasure value are the same, the command value generating section may generate the turning torque command value by subtracting the external disturbance countermeasure value calculated by the external disturbance countermeasure value generating section from the turning torque target value, and if the sign of the turning torque target value and the sign of the external disturbance countermeasure value are different, the command value generating section may generate the turning torque command value without subtracting the external disturbance countermeasure value calculated by the external disturbance countermeasure value generating section from the turning torque target value. According to this configuration, since the command value generating section is supplied with the external disturbance countermeasure value generated by the external disturbance countermeasure value generating section if the sign of the turning torque target value and the sign of the external disturbance countermeasure value are the same, the following occurs. That is, in such a case, when the turning torque command value is being generated, the external disturbance countermeasure value is subtracted from the turning torque target value. Then, a turning torque command value in which the external disturbance turning torque is cancelled out is generated. Furthermore, according to this configuration, since the command value generating section is not supplied with the external disturbance countermeasure value generated by the external disturbance countermeasure value generating section if the sign of the turning torque target value and the sign of the external disturbance countermeasure value are different from each other, the following occurs. That is, in such a case, a torque caused by an external disturbance is utilized when the control section intentionally causes the aircraft to turn.

The command value generating section may be configured to generate the turning torque command value by further subtracting a value acquired by multiplying the sensor detection value by a prescribed gain from the turning torque target value.

The aircraft (10) includes the aircraft control apparatus described above.

The program causes a computer provided to an aircraft, which includes a plurality of rotor wings and a plurality of drive sections that respectively rotate the plurality of rotor wings, to perform a step (S2) of generating a turning torque command value based on a turning torque target value, which is a target value for a turning torque of the aircraft; and a step of generating an external disturbance countermeasure value corresponding to the turning torque caused by an external disturbance, based on the turning torque command value and a sensor detection value acquired using a sensor included in the aircraft, wherein the step of generating the turning torque command value includes generating the turning torque command value by subtracting the external disturbance countermeasure value from the turning torque target value.

REFERENCE SIGNS LIST

10: aircraft
11: machine body
18: rider
22: manipulation apparatus
80: control section (aircraft control apparatus)
82LF, 82LR, 82RF, 82RR: load cell
98: manipulation amount detection sensor
100: angular velocity sensor (sensor)
102: angle sensor (sensor)
104: turning torque target value setting section
106: command value generating section
108: external disturbance countermeasure value generating section
110: command signal generating section
148: passage selecting section

What is claim is:

1. An aircraft control apparatus that controls an aircraft including a plurality of rotor wings and a plurality of drive sections that respectively rotate the plurality of rotor wings, the aircraft control apparatus comprising:
    a command value generating section configured to generate a turning torque command value based on a turning torque target value, which is a target value for a turning torque of the aircraft; and
    an external disturbance countermeasure value generating section configured to generate an external disturbance countermeasure value corresponding to a turning torque caused by an external disturbance, based on the turning torque command value generated by the command value generating section and a sensor detection value acquired using a sensor included in the aircraft,
    wherein the command value generating section is configured to generate the turning torque command value by subtracting the external disturbance countermeasure value generated by the external disturbance countermeasure value generating section from the turning torque target value.

2. The aircraft control apparatus according to claim 1, wherein the external disturbance countermeasure value generating section is configured to generate the external disturbance countermeasure value by subtracting, from the sensor detection value, a value corresponding to the turning torque command value and a value corresponding to an external disturbance countermeasure value already acquired by the external disturbance countermeasure value generating section.

3. The aircraft control apparatus according to claim 1, further comprising a turning torque target value setting section configured to set the turning torque target value,
    wherein the turning torque target value setting section is configured to set the turning torque target value based on movement of a center of mass of a rider.

4. The aircraft control apparatus according to claim 1, further comprising a turning torque target value setting section configured to set the turning torque target value,
    wherein the turning torque target value setting section is configured to set the turning torque target value based on a manipulation amount of a manipulation apparatus caused by a rider.

5. The aircraft control apparatus according to claim 1, wherein the external disturbance is a change in a position of a center of mass of the aircraft caused by movement of a center of mass of a rider or a change in the position of the center of mass of the aircraft caused by wind.

6. The aircraft control apparatus according to claim 1, wherein if a sign of the turning torque target value and a sign of the external disturbance countermeasure value are same, the command value generating section generates the turning torque command value by subtracting the external disturbance countermeasure value calculated by the external disturbance countermeasure value generating section from the turning torque target value, and if the sign of the turning torque target value and the sign of the external disturbance countermeasure value are different, the command value generating section generates the turning torque command value without subtracting the external disturbance countermeasure value calculated by the external disturbance countermeasure value generating section from the turning torque target value.

7. The aircraft control apparatus according to claim 1, wherein the command value generating section is configured to generate the turning torque command value by further subtracting a value acquired by multiplying the sensor detection value by a prescribed gain from the turning torque target value.

8. An aircraft comprising an aircraft control apparatus, a plurality of rotor wings, and a plurality of drive sections that respectively rotate the plurality of rotor wings, the aircraft control apparatus configured to control the aircraft, the aircraft control apparatus comprising:
   a command value generating section configured to generate a turning torque command value based on a turning torque target value, which is a target value for a turning torque of the aircraft; and
   an external disturbance countermeasure value generating section configured to generate an external disturbance countermeasure value corresponding to a turning torque caused by an external disturbance, based on the turning torque command value generated by the command value generating section and a sensor detection value acquired using a sensor included in the aircraft,
   wherein the command value generating section is configured to generate the turning torque command value by subtracting the external disturbance countermeasure value generated by the external disturbance countermeasure value generating section from the turning torque target value.

9. A non-transitory computer-readable storage medium storing a program, wherein the program that causes a computer provided to an aircraft, which includes a plurality of rotor wings and a plurality of drive sections that respectively rotate the plurality of rotor wings, to perform a process comprising:
   generating a turning torque command value based on a turning torque target value, which is a target value for a turning torque of the aircraft; and
   generating an external disturbance countermeasure value corresponding to a turning torque caused by an external disturbance, based on the turning torque command value and a sensor detection value acquired using a sensor included in the aircraft,
   wherein the generating the turning torque command value includes generating the turning torque command value by subtracting the external disturbance countermeasure value from the turning torque target value.

* * * * *

UNITED STATES PATENT AND TRADEMARK OFFICE
CERTIFICATE OF CORRECTION

PATENT NO. : 11,267,566 B2
APPLICATION NO. : 17/263168
DATED : March 8, 2022
INVENTOR(S) : Murakami

Page 1 of 1

It is certified that error appears in the above-identified patent and that said Letters Patent is hereby corrected as shown below:

In the Claims

At Line 8, in Column 18, in Claim 9:
"wherein the program that causes" should read "wherein the program causes"

Signed and Sealed this
Twenty-first Day of June, 2022

Katherine Kelly Vidal
*Director of the United States Patent and Trademark Office*